United States Patent
Adir et al.

(10) Patent No.: US 6,925,405 B2
(45) Date of Patent: Aug. 2, 2005

(54) ADAPTIVE TEST PROGRAM GENERATION

(75) Inventors: Allon Adir, Tivon (IL); Roy Emek, Kfar Shmaryahu (IL); Eitan Marcus, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 10/040,940

(22) Filed: Jan. 9, 2002

(65) Prior Publication Data

US 2003/0130813 A1 Jul. 10, 2003

(51) Int. Cl.[7] .............................................. G01R 27/28
(52) U.S. Cl. ........................................ 702/119; 700/86
(58) Field of Search ......................... 712/228; 717/100, 717/126; 702/119, 122, 123; 700/86; 714/38; 716/4

(56) References Cited

U.S. PATENT DOCUMENTS

| | | | | |
|---|---|---|---|---|
| 4,493,027 A | * | 1/1985 | Katz et al. .................. | 712/228 |
| 5,572,666 A | | 11/1996 | Whitman | |
| 5,729,554 A | | 3/1998 | Weir | |
| 5,774,358 A | * | 6/1998 | Shrote ......................... | 700/86 |
| 6,467,078 B1 | * | 10/2002 | Matsuba et al. ............ | 717/100 |
| 2002/0002698 A1 | * | 1/2002 | Hekmatpour .................. | 716/4 |
| 2003/0158720 A1 | * | 8/2003 | Liu ............................. | 703/17 |

OTHER PUBLICATIONS

A. Chandra, et al "AVGEN—A Test Generator for Architecture Verification" IEEE Transactions on Very Large Scale Integration (VLSI) Systems, vol. 3, No. 2, pp. 188–200, Jun. 1995.

Yossi Lichtenstein et al, "Model Based Test Generation for Processor Verification" IBM Israel Science and Technology, Sixth Innovative Applications of Artificail Intelligence Conference, Aug. 1994, pp. 83–94.

* cited by examiner

*Primary Examiner*—John Barlow
*Assistant Examiner*—Xiuqin Sun
(74) *Attorney, Agent, or Firm*—Browdy and Neimark, P.L.L.C.

(57) ABSTRACT

A test program generator that produces test instructions according to a specification of a system being verified. The instructions are typically generated randomly, at least in part, and are then. The system is capable of interpreting events, detecting an impending occurrence of an event, and responding to the event by switching to an alternate input stream.

22 Claims, 3 Drawing Sheets

ADAPTIVE TEST PROGRAM GENERATION

BACKGROUND OF THE INVENTION

1. Field of the Invention

This invention generally relates to design verification, and more specifically relates to test program generation in a context of a computer mechanism and method for testing a design for compliance with the design specification.

2. Description of the Related Art

The extension of modern information technology into everyday life is due in large part to the existence, functionality and relatively low cost of advanced integrated circuits, and in particular to advancements in computer processors. As technology has advanced, the sophistication of both the hardware and software of computer systems have greatly increased. An important aspect of designing an advanced computer system is the ability to thoroughly test its design to assure that the design complies with desired specifications. Usually, such verification requires the generation of a test programs to assure that the system behaves properly under a wide variety of circumstances.

Test program generators are basically sophisticated software engines, which are used to create numerous test cases. By appropriate configuration, it is possible for test program generation to be focused on very specific ranges of conditions, or broadened to cover a wide range of logic. Today, large numbers of test cases can be created in the time that a single test case could be written manually, as was done prior to the advent of test program generators.

Typically, the input to the test program generator is a sequence of partially specified instructions, which acts as a template for the test to be generated. The input stream is generally incomplete, in that various details of each instruction, such as the specific source and the target resources to be used, the data values of each uninitialized resource, and even the type of the instruction to be generated, may be left unspecified. The test program generator then generates a complete test program by filling in the missing information of each instruction with valid combinations of random values. The choice of random values is often biased, either explicitly in the input file, or through testing knowledge known to the test program generator, so as to increase the likelihood of detecting a design flaw. The use of templates in this manner allows the creation of numerous test cases that stress the implementation of the logic of the design.

Early test program generators were static, in that they worked without any knowledge of the running state of the verified design during the generation of the test. Without this knowledge, it was necessary for the test program generator to guess the state when considering its choice of legal or interesting values.

Dynamic test program generators were subsequently developed, which simulate the test as it is being generated. The information obtained from the simulation is used to guide the test program generator, without forcing it to resort to extensive speculation as to what values may be desirable.

During the past decade, model-based random test program generators have become popular in processor architectural design verification and software testing. An example of such a random test generators include the IBM tool, "Genesys", which is disclosed in the document *Model-Based Test Generation for Process Design Verification*, Y. Lichtenstein et al., Sixth Innovative Applications of Artificial Intelligence Conference, August 1994, pp. 83–94.

Another conventional test generator, AVPGEN, is disclosed in the document *AVPGEN—A Generator for Architecture Verification Test Cases*, A. Chandra, et al. IEEE Trans. Very Large Scale Integration (VLSI) Syst. 3, No. 2, 188–200 (June 1995).

Known test program generators are limited in their abilities to adapt to unexpected situations encountered during the test, and offer at best ad hoc, solutions to handle situations such as program interrupts.

SUMMARY OF THE INVENTION

It is an advantage of some aspects of the present invention that an event handling mechanism is provided in a test program generator, which can deal with disparate exceptional situations that may be encountered during test program generation.

It is another advantage of some aspects of the present invention that beneficial situations encountered during test program generation can be recognized and exploited.

It is yet another advantage of some aspects of the present invention that detrimental situations or failures encountered during test program generation can be recognized and avoided before they happen.

It is a further advantage of some aspects of the present invention that events to be recognized during test program generation can be defined without modification or recompilation of a test program generator.

It is yet a further advantage of some aspects of the present invention that the body of events is defined using the same language used for generating the main input stream.

These and other advantages of the present invention are attained by a test program generator that produces test instructions according to a specification of a design being verified. The instructions are typically generated randomly, at least in part. The system is capable of interpreting defined events, detecting an impending occurrence of an event by evaluating the condition of the event, and responding to the event by generating an alternate input stream defined as part of the event.

An important consequence of using randomly generated test cases is that the execution of the test may lead to situations that cannot be anticipated at the time the input stream is written. Examples of such events include (1) program interrupts, (2) the event that there is insufficient continuous unoccupied memory to store subsequent instructions, and (3) false branch prediction.

Some of the above noted events, for example the event that there is insufficient continuous unoccupied memory are detrimental, because they are likely to cause failure of test program generation. Other events may be viewed as beneficial, in that the situation that arises on their occurrence can be exploited to increase the likelihood of finding design flaws.

In order to deal with events such as the exemplary events noted above, it is desirable to generate an alternate input stream. In the case of detrimental events, the approach is to detect the situation prior to its actual occurrence, and issuing appropriate instructions to avoid its occurrence. Beneficial events also need to be detected, so that alternative instructions may be inserted into the test to exploit the situation.

The ability of users to detect the occurrence of triggering conditions of events and to inject an alternate input stream into the test program is referred to herein as "adaptive test program generation". Using adaptive test program generation, users can define multiple input streams for the test program generator that are reactive to the running states of the generation. Because of randomness, such states cannot be known at the time the input is defined.

The invention provides a system for verification of a system design, including a test program generator that accepts a sequence of statements, including at least one event, an event handling facility in the test program generator, wherein responsive to a triggering condition of the event, the test program generator emits test program instructions in response to either a primary input stream or an alternate input stream. The alternate input stream is represented in the body of the event.

According to an aspect of the system, a plurality of events are processed in order of priority values thereof in the event handling facility.

According to still another aspect of the system, a conditional statement of the event references a current state of a test program that is generated by the test program generator.

The invention provides a method of test program generation, which includes the steps of defining a set of statements. The set of statements includes an event. The method includes generating a sequence of test program instructions for a target responsive to the set of statements, and while generating the sequence of test program instructions, determining if a condition of the event is satisfied. If the condition is satisfied, an alternate sequence of test program instructions is generated.

In an aspect of the method, a state of the target is evaluated prior to inclusion of an instruction in the sequence of test program instructions.

According to still another aspect of the method, at least a portion of the sequence of test program instructions is randomly generated.

According to still another aspect of the method, the event includes an identifying name attribute, a triggering condition attribute, and an input stream entity.

The invention provides a method of test program generation, including the steps of providing a test program generation engine, and coupling the test program generation engine to a design specification of a target, wherein the design specification includes a knowledge base. The method further includes coupling the test program generation engine to an architectural simulator of the target, introducing a set of statements into the test program generation engine, the set of statements including an event, determining whether a triggering condition of the event is satisfied. In a first case, wherein the triggering condition is not satisfied, the method includes causing the test program generation engine to respond to the set of statements to generate a first sequence of test program instructions that can be executed on the target, and in a second case, wherein the triggering condition is satisfied, causing the test program generation engine to respond to an alternate set of statements embodied in the event to generate a second sequence of test program instructions that can be executed on the target.

According to an aspect of the method, at least a portion the test program instructions is generated randomly.

In another aspect of the method, a state of the target is evaluated prior to inclusion of an instruction in the first sequence of test program instructions.

According to another aspect of the method, the set of statements is introduced into the test program generation engine as an input file.

The invention provides a computer software product, including a computer-readable medium in which computer program instructions are stored, which instructions, when read by a computer, cause the computer to generate test programs by performing the steps of accepting a set of statements, the set of statements including an event. Responsive to the set of statements a sequence of test program instructions is generated for a target. While performing generating the sequence of test program instructions the computer is caused to determine if a condition of the event is satisfied, and responsive to the determination, to generate an alternate sequence of test program instructions.

An aspect of the computer software product includes instructing the computer to access a knowledge base that has information of the target stored therein, and selecting members of the sequence of test program instructions in accordance with the information in the knowledge base, the selection being biased by the set of statements.

The invention provides a computer software product, including a computer-readable medium in which computer program instructions are stored, which instructions, when read by a computer, cause the computer to generate test programs by performing the steps of defining a test program generation engine in a memory, defining a design specification of a target in the memory, wherein the design specification includes a knowledge base, defining an architectural simulator of the target in the memory, coupling the test program generation engine to the design specification, coupling the test program generation engine to the architectural simulator, accepting a set of statements into the test program generation engine, the set of statements including an event, and responsive to the set of statements, and to information in the knowledge base, causing the test program generation engine to generate a test program instruction that can be executed on the target. The computer is thereafter caused to determine in the architectural simulator whether a triggering condition of the event is satisfied by a simulated execution of the test program instruction. In a first case, wherein the triggering condition is not satisfied, the computer causes the test program generation engine to respond to the set of statements to generate a first sequence of test program instructions that can be executed on the target, and in a second case, wherein the triggering condition is satisfied, causes the test program generation engine to respond to an alternate set of statements of the event to generate a second sequence of test program instructions that can be executed on the target.

In an aspect of the computer software product the determination step is performed by evaluating a state of the target prior to inclusion of the test program instruction in one of the first sequence of test program instructions and the second sequence of test program instructions.

In a further aspect of the computer, software product evaluating the state is performed prior to the simulated execution of the test program instruction.

In yet another aspect of the computer software product, evaluating the state is performed subsequent to the simulated execution of the test program instruction.

In still another aspect of the computer software product evaluating the state is performed a first time prior to a simulated execution of the test program instruction and is performed a second time subsequent to the simulated execution thereof.

According to one aspect of the computer software product, the set of statements is introduced into the test program generation engine as an input file.

The invention provides a test program generator, including a test program generation engine, a design specification of a target, wherein the design specification includes a knowledge base, wherein the test program generation engine is coupled to the design specification, an architectural simulator of the target coupled to the test program generation engine, wherein the test program generation engine is adapted to accept a set of statements, the set of statements including an event, responsive to the set of statements, and to information in the knowledge base, the test program generation engine generates a test program instruction that can be executed on the target. The test program generation engine determines whether a triggering condition of the event is satisfied by a simulated execution of the test program instruction. In a first case, wherein the triggering condition is not satisfied, responsive to the set of statements the test program generation engine generates a first sequence of test program instructions that can be executed on the target, and in a second case, wherein the triggering condition is satisfied, responsive to an alternate input stream in the event, the test program generation engine generates a second sequence of test program instructions that can be executed on the target.

An aspect of the test program generator is a design simulator for simulating the execution of the test program instruction.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

Definitions.

A "statement" is a single item for controlling generation of the test. Statements can either be "instruction statements", which are partially specified instructions, which describe test program instructions to be generated, or "control statements" which direct the flow of control of other statements.

A "directive" is a biasing component that can be attached to statements for test program generation.

An "event" is a combination of a condition and an input stream or stream entity. The input stream is used to generate instructions if the condition is satisfied.

An "input stream" is a sequence of partially specified instructions, which acts as a template for the test program to be generated.

A "definition file" or "input file" is a file, in which the statements and events for a test are stored. It directs generation of the test.

Architectural Overview.

Figure 1:
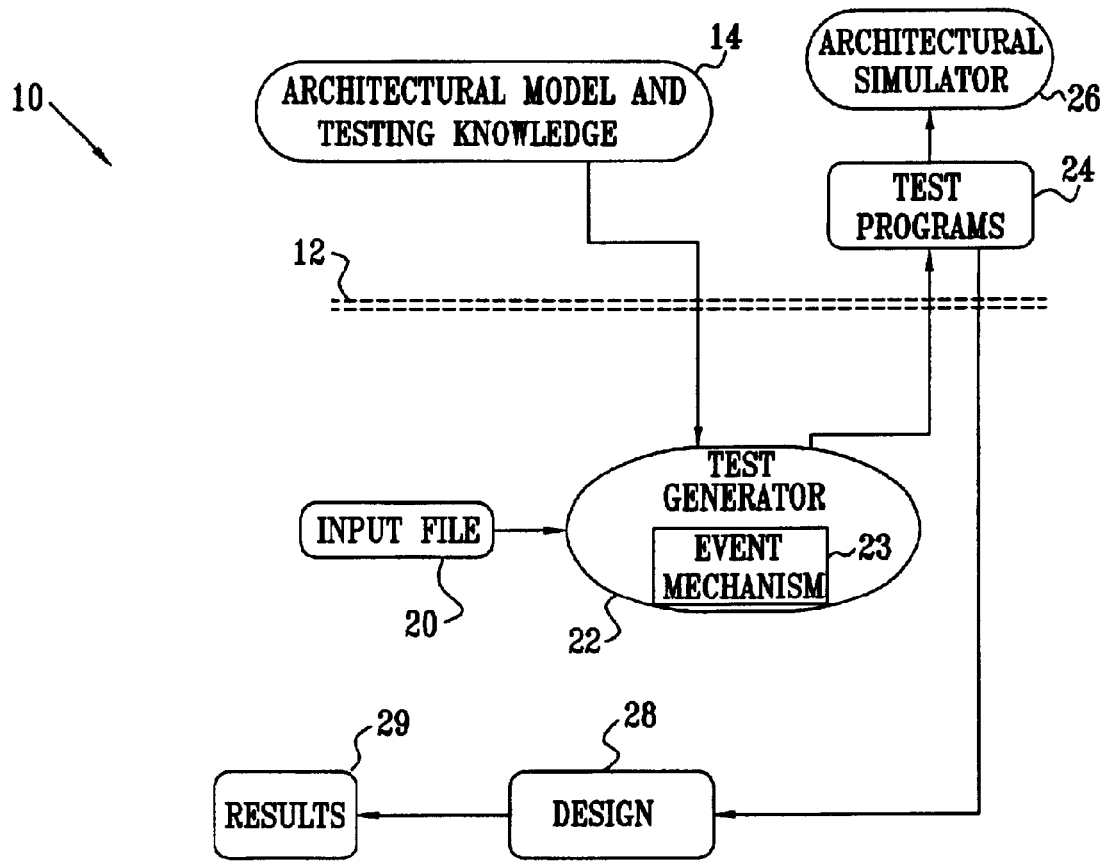
FIG. 1 is a block diagram of a test program generator that is operable in accordance with a preferred embodiment of the invention.

Reference is now made to FIG. 1, which is a block diagram of a test program generator that is operable in accordance with a preferred embodiment of the invention. A design verification system 10, used for verifying a software or hardware design, has several basic interacting components. Those components of the design verification system 10 that are located above a broken line 12 are dependent on the specification of the design being verified, while those located below the line 12 are independent of the specification.

The design verification system 10 enables the creation of tests that have various degrees of randomness. The ability of the design verification system 10 to introduce random unspecified values is fundamental, since design flaws in practice are usually unpredictable.

An architectural model 14 holds a formal description of the specification of the system. This specification may be stored in a database, which may also incorporate testing knowledge of the system design. The integration of all the information stored in the architectural model 14 is referred to herein as the knowledge base of the test program generator. The knowledge base typically includes heuristics, which represent test engineering expertise, and the knowledge base is designed to allow expert users to add knowledge.

The content of an input file 20 is the input to a generic test program generator engine 22. The input file 20 is the main medium through which the test program generator engine 22 is influenced. This influence includes, for example, the identity of the test instructions, their relative order, and various events relating to the instructions. The test program generator engine 22 incorporates an event mechanism 23 for detecting and processing events in the input file 20.

It is an important aspect of the invention that alternate input streams can be defined. These input streams are reactive to conditions that could occur during the execution of a test. In some cases, an input stream may exploit some condition, while in other cases the input stream may be designed to avoid the occurrence of a condition. Adaptive test program generation is achieved in the design verification system 10 by event detection and handling using the event mechanism 23.

An event is represented by a condition and a set of statements that is generated only the condition is satisfied. It is an important feature of the present invention that events are definable, and are recognized by the test program generator engine 22, and processed therein. An advantage of introducing events into the test program generation process is the capability of extensively adapting the behavior of the test program generator engine 22 to unexpected situations in a controlled manner, even though a high degree of randomness can be present in the generation of test instructions.

In addition to receiving input via the input file 20, the test program generator engine 22 receives input information from the architectural model 14. The test program generator engine 22 generates test programs 24, during which process instructions are executed on an architectural simulator 26, and ultimately executed on a target or design 28, which can be a simulator. This produces results 29. The test program generator engine 22 may receive some generic knowledge of the specification, and can exploit this knowledge so as to generate sequences of instructions.

The output of the test program generator engine 22 is a sequence of instructions. In a dynamic mode of operation, each instruction is first generated by the test program generator engine 22 and is then simulated by the architectural simulator 26. Generation typically involves selecting the instruction, the operands and the resources, and initializing the resources. As this is done, the instruction built by the test program generator engine 22 is passed to the architectural simulator 26, and eventually to the design 28 for execution. This cycle continues with the next instruction.

The architectural simulator 26 is used to predict the results of instruction execution in accordance with the specification of the system being verified. Any conventional behavioral simulator is suitable for the architectural simulator 26.

Input File Details.

Figure 2:
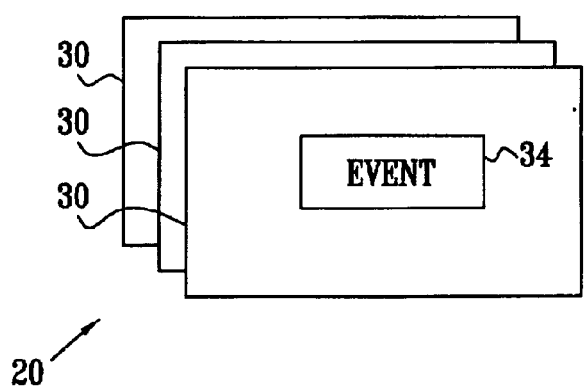
FIG. 2 is a block diagram of an input file structure in accordance with a preferred embodiment of the invention.

Reference is now made to FIG. 2, which is a high level block diagram of an input file in accordance with a preferred embodiment of the invention. Input files are a preferred medium for practicing the present invention. The input file 20 is essentially a list of statements 30 for controlling the test output. There are various types of statements. The statements 30 may include, an event 34, and conventional instructions (not shown) that are unrelated to events.

Instructions.

Instruction statements are the most basic statements in the input file 20. Instruction statements in the input file 20 are to be distinguished from test program instructions that are actually output by the test program generator.

Statements.

The statements 30 in the input file 20 actually constitute a program that is interpreted by the test program generator engine 22. The programming language includes constructs that are used to control the operation of the test program generator engine 22. The language includes conditional statements, which can reference the current state of the program generated by the test program generator engine 22. These control constructs are not themselves generated.

Events.

Figure 3:
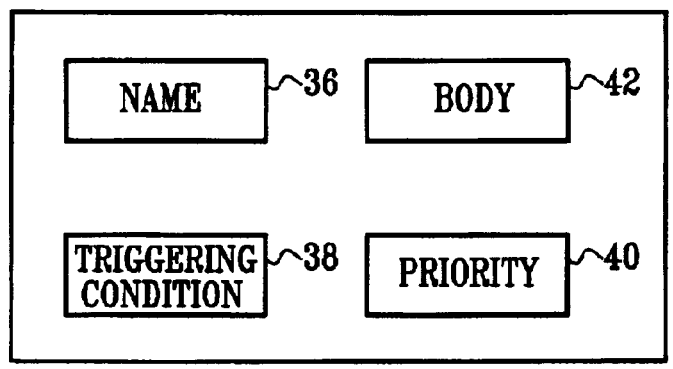
FIG. 3 is a block diagram illustrating the structure of an event, which is operative in the test program generator shown in FIG. 1 in accordance with a preferred embodiment of the invention.

Reference is now made to FIG. 3, which is a block diagram illustrating the structure of an event 34 (FIG. 2) which is operative in accordance with a preferred embodiment of the invention. The event 34 has a group of specialized attributes: an identifying name 36, a triggering condition 38, a priority value 40 and an input stream or body 42 that defines instructions to be generated.

The name 36 is simply the identifier of the event. It is a required attribute.

The triggering condition 38 is a condition that is checked to decide whether the body 42 should be used as the current input stream of the test program generator engine 22 to generate instructions. It is a required attribute. In some cases the triggering condition 38 can be given the value TRUE, in which case the body 42 is always used.

In some embodiments, events may be specified directly in the input files. In other embodiments, events may be stored in separate event files, which are included by the input file 20. It is also possible for event files to include other event files.

Figure 4:
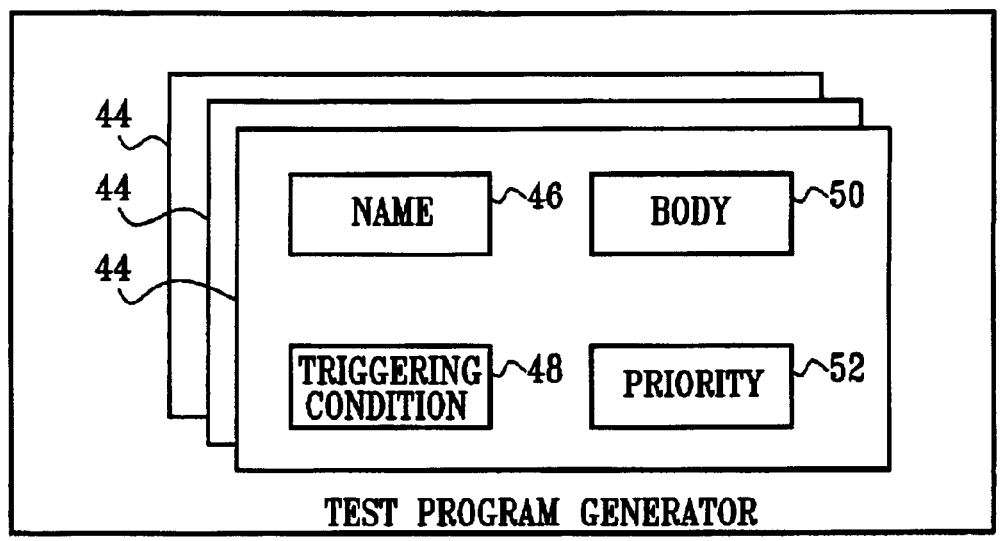
FIG. 4 is a block diagram illustrating a test generator engine of the test program generator shown in FIG. 1 in accordance with a preferred embodiment of the invention.

Reference is now made to FIG. 4, which is a block diagram illustrating the test generator engine in further detail, in accordance with a preferred embodiment of the invention. The test program generator engine 22 (FIG. 1) maintains a list of events 44. Each of the events 44 includes a name 46, and is used for purposes of identification, a triggering condition 48, a body 50, which is an alternate input stream to be generated when the event occurs, and further includes a relative priority value 52. Evaluation of triggering conditions by the test program generator engine 22 occurs in order of the priority value 52.

Listing 1 is a high level procedure which is encoded into the test program generator engine 22 for the detection and handling of events that are defined in the input file.

Listing 1

Procedure: HandleEvents
Input: currentStatement
1. For each event eh in order of priority
   //check if event is disabled
   2. If !currentStatement→Disables (eh)
      //evaluate triggering condition
      3. if eh→ConditionIsTriggered( )
         //use the input stream specified by the
         //event's body to generated instructions
         4. eh→GenerateInstructionStream( )

The procedure HandleEvents in Listing 1 is called by the test program generator engine 22 before each instruction is generated.

Design flaws are often exposed when two or more events occur concomitantly. For example, a program interrupt occurring while another interrupt is being handled, or following a false branch prediction. In order to expose such flaws, the procedure HandleEvents is designed to handle events recursively. When nesting of events occurs, the processing of the primary event is paused while the secondary event is handled.

EXAMPLES

The following examples are useful in explaining the operation of an event according to the invention. In Listing 2 and Listing 3, the body of the named event is a single instruction. However the body of an event is an input stream, and not limited to a single instruction.

Branch-on-zero Event.

A branch-on-zero event occurs whenever the zero bit of a particular conditional register is set. Recognition of the branch-on-zero event by the test program generator engine 22 (FIG. 1), using one of the events 44 (FIG. 4); results in the generation of a conditional branch. The particulars of the event for the branch-on-zero event are shown in Listing 2.

Listing 2

Name: BranchOnZero
//Check if the zero bit of the condition register

// is set
cond: ConditionRegisterZero=1
//issue a conditional branch on zero instruction
body:
    bez Escape Sequence Event.

An escape sequence event occurs whenever there is insufficient uninitialized memory at the address currently held in the program counter (PC). Recognition of the escape sequence event by the test program generator engine 22, using another one of the events 44, causes the generation of an unconditional branch to an unoccupied memory location using the event mechanism 23. The particulars of the event for the escape sequence event are shown in Listing 3.

Listing 3 name: EscapeSequence
//check that there is sufficient room to write
//a branch instruction, but nothing else
cond: !IsInitialized ($PC) AND IsInitialized ($PC+4)
//generated branch instruction
body:
    br Interrupt Handler.

The event shown in Listing 4 is typical of an interrupt handler generated by the test program generator engine 22 (FIG. 1). It responds to an event entitled "DSI", which involves an interrupt, and includes instructions that return the program counter to the address immediately following the instruction that caused the interrupt. The triggering condition for the event is that the program counter contains the address (or addresses) appropriate to the interrupt.

Listing 4

Name: DSI_Interrupt_Handler
//check that DSI exception occurred
cond: $PC==0x0000000000000300||
    $PC==0x0000000000000304
//generated handler instructions
body:
    mfsr G1
    addi G1, G1, 0x4
    mtsr G1
    rfi Operation.

Figure 5:
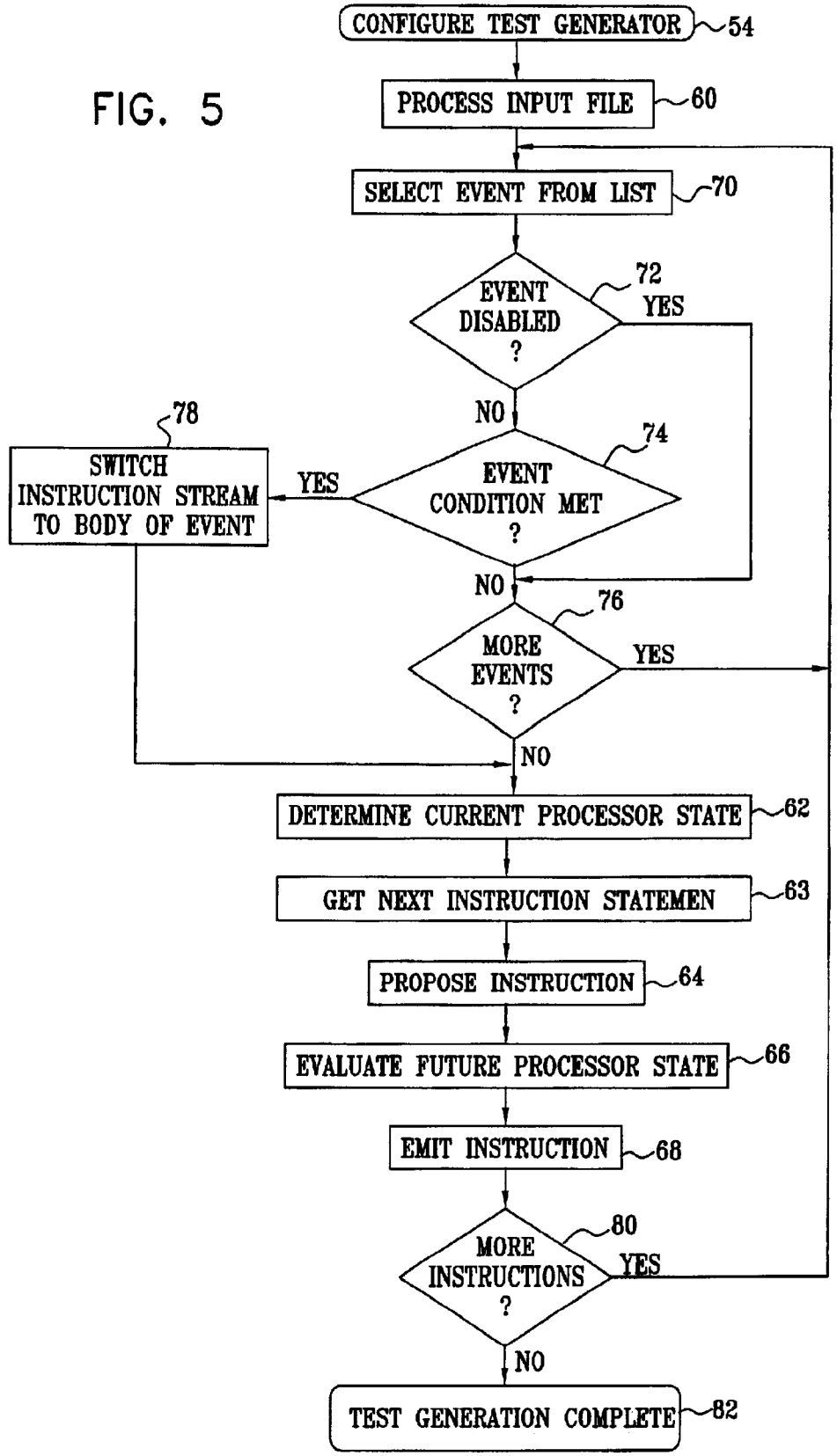
FIG. 5 is a flow chart of a method of test program generation, which is operative in accordance with a preferred embodiment of the invention.

Reference is now made to FIG. 5, which is a flow chart illustrating a method of test program generation, which is operative in accordance with a preferred embodiment of the invention. The description of FIG. 5 should be read in conjunction with FIGS. 1, 2, 3, and 4. The test program generation cycle begins at initial step 54, in which the design verification system 10 (FIG. 1) is configured for testing the system design. Appropriate files are loaded in order to initialize the test program generator engine 22, the architectural model 14, the architectural simulator 26, and the design 28.

Next, at step 60, the test program generator engine 22 reads the input file 20. In particular, each event 34 is interpreted by the test program generator engine 22, and stored in a list of events 44 (FIG. 4). For purposes of this disclosure, only the processing of events is disclosed with reference to FIG. 5, it being understood that many statements unrelated to events may also be read from the input file 20, which would be processed conventionally.

The list of the events 44 that were developed in step 60 are scanned in order of priority. At step 70 the member of the list of events 44 having the highest priority, and which is as yet unevaluated is selected.

Decision step 72 is an optional step that is performed in alternate embodiments where events may be disabled. Decision step 72 can be omitted, in which case control passes directly from step 70 to decision step 76.

At decision step 72 a test is made to determine whether the event selected in step 70 is currently disabled. If the determination at decision step 72 is affirmative, then control proceeds to decision step 76.

If the determination at step 70 is negative, then control proceeds to decision step 74.

At decision step 74 the event selected in step 70 is evaluated to determine if its triggering condition 48 currently holds. The triggering condition 48 is a Boolean expression that is evaluated by the test program generator engine 22, which may refer to current resource values. In such a case the test program generator engine 22 may refer to the architectural simulator 26 in order to access these values. For example, if the test program generator engine 22 evaluates the condition of the event given in Listing 4, it needs to know the value of the program counter register ($PC), and may obtain this value from the architectural simulator 26.

If the determination at decision step 74 is negative, then control proceeds to decision step 76, which is disclosed below.

If the determination at decision step 74 is affirmative, then control proceeds to step 78. The input stream is switched to an alternate input stream, which is specified in the body 50 of the current one of the events 44. The alternate input stream is used as a template to generate test program instructions in the same manner as the primary input stream. Step 78 is typically implemented recursively. The processing of the primary input stream is suspended until the alternate input stream begun in step 78 is completed. Control is then transferred to step 62, which is disclosed below.

At decision step 76, it is determined if more events remain to be evaluated. If the determination at decision step 76 is affirmative, then control returns to decision step 70 to process the next event.

If the determination at decision step 76 is negative, then control proceeds to step 62.

At step 62 the generation of a test program instruction sequence is begun, using either the primary input stream or the alternate input stream initiated in step 78. A current state of the design is determined, using the architectural simulator 26.

Next, at step 63 an instruction is obtained from the current input stream. Control now proceeds to step 64.

At step 64, the test program generator engine 22 proposes an instruction. The proposed instruction may have randomly generated values, depending upon the current test program generation policy in force, and subject to any rule constraints that may be in effect.

Next, at step 66, the proposed instruction is evaluated in the architectural simulator 26. The states of the design existing immediately prior to execution of the instruction, and the predicted state following execution of the instruction are then both known.

Next, in step 68, the test program generator engine 22 outputs the instruction that was proposed at step 64 as part of the test program being generated. Control passes to decision step 80.

At decision step 80, it is determined if more test program instructions need to be generated in the test. If the determination at decision step 80 is affirmative, then control returns to step 70.

If the determination at decision step 80 is negative then control proceeds to final step 82, and the current phase of the test program generation cycle is complete.

Alternative Modes of Operation.

In some embodiments, for any statement, or sequence of statements in the input stream, it may be specified that detection and activation of a particular event should be disabled during test program generation. This provides enhanced control of the test program generation process.

While this invention has been explained with reference to the structure disclosed herein, it is not confined to the details set forth, and this application is intended to cover any modifications and changes as may come within the scope of the following claims:

What is claimed is:

1. A method of test program generation for a system-under-test, comprising the steps of:
   using a primary input stream to generate a sequence of test program instructions for said system-under-test;
   defining a set of events, each event in said set having a triggering condition and a predetermined alternate input stream, said primary input stream and said alternate input stream comprising sequences of partially specified program instructions for said system-under-test;
   recognizing that said triggering condition of one of said events is satisfied in said primary input stream;
   responsively to said step of recognizing, selecting one of said primary input stream and said alternate input stream as a continuation input stream; and
   generating subsequent test program instructions using said continuation input stream.

2. The method according to claim 1, wherein said step of defining a set of events is performed by including a portion of said events in an input file that comprises said primary input stream.

3. The method according to claim 1, wherein said step of defining a set of events is performed by storing said set in an event file.

4. The method of claim 1, wherein an occurrence of said triggering condition occurs nonpredeterminedly in said primary input stream.

5. The method of claim 1, wherein said events have priority values, and are processed in order of said priority values.

6. The method according to claim 1, wherein at least a portion of said sequence of test program instructions are randomly generated.

7. A computer software product, including a computer-readable medium in which computer program instructions are stored, which instructions, when read by a computer, cause the computer to perform a method of test program generation for a system-under-test, comprising the steps of:
   using a primary input stream to generate a sequence of test program instructions for said system-under-test;
   loading a set of events, each event in said set having a triggering condition and a predetermined alternate input stream, said primary input stream and said alternate input stream comprising sequences of partially specified program instructions for said system-under-test;
   recognizing that said triggering condition of one of said events is satisfied is satisfied in said primary input stream;
   responsively to said step of recognizing, selecting one of said primary input stream and said alternate input stream as a continuation input stream; and
   generating subsequent test program instructions using said continuation input stream.

8. The computer software product according to claim 7, wherein said step of defining a set of events is performed by reading a portion of said events from an input file that comprises said primary input stream.

9. The computer software product according to claim 7, wherein said set of events is loaded from an event file.

10. The computer software product of claim 7, wherein an occurrence of said triggering condition occurs nonpredeterminedly in said primary input stream.

11. The computer software product of claim 7, wherein said events have priority values, and are processed in order of said priority values.

12. The computer software product according to claim 7, wherein at least a portion of said sequence of test program instructions are randomly generated.

13. A test program generator, comprising:
   a test program generation engine;
   a design specification of a target, wherein said design specification comprises a knowledge base, wherein said test program generation engine is coupled to said design specification;
   an architectural simulator of said target coupled to said test program generation engine;
   said test program generation engine and said architectural simulator being co-operative to perform a method of test program generation for a system-under-test, comprising the steps of:
   using a primary input stream to generate a sequence of test program instructions for said system-under-test;
   loading a set of events, each event in said set having a triggering condition and a predetermined alternate input stream, said primary input stream and said alternate input stream comprising sequences of partially specified program instructions for said system-under-test;
   recognizing that said triggering condition of one of said events is satisfied;
   responsively to said step of recognizing, selecting one of said primary input stream and said alternate input stream as a continuation input stream; and
   generating subsequent test program instructions using said continuation input stream.

14. The test program generator according to claim 13, wherein a portion of said set of events are included in said primary input stream.

15. The test program generator according to claim 13, wherein said set of events is loaded from an event file.

16. The test program generator according to claim 13, wherein an occurrence of said triggering condition occurs nonpredeterminedly in said primary input stream.

17. The test program generator according to claim 13, wherein said events have priority values, and are processed in order of said priority values.

18. A test program generator, comprising:
   a test program generation engine;
   a design specification of a target, wherein said design specification comprises a knowledge base, wherein said test program generation engine is coupled to said design specification;
   said test program generation engine and being operative to perform a method of test program generation for a system-under-test, comprising the steps of:
   using a primary input stream to generate a sequence of test program instructions for said system-under-test;

loading a set of events, each event in said set having a triggering condition and a predetermined alternate input stream, said primary input stream and said alternate input stream comprising sequences of partially specified program instructions for said system-under-test;

recognizing that said triggering condition of one of said events is satisfied;

responsively to said step of recognizing, selecting one of said primary input stream and said alternate input stream as a continuation input stream; and generating subsequent test program instructions using said continuation input stream.

19. The test program generator according to claim 18, wherein a portion of said set of events are included in said primary input stream.

20. The test program generator according to claim 18, wherein said set of events is loaded from an event file.

21. The test program generator according to claim 18, wherein an occurrence of said triggering condition occurs nonpredeterminedly in said primary input stream.

22. The test program generator according to claim 18, wherein said events have priority values, and are processed in order of said priority values.

* * * * *